No. 769,396. PATENTED SEPT. 6, 1904.
E. NOVAK.
CAN OPENER.
APPLICATION FILED APR. 11, 1904.
NO MODEL.
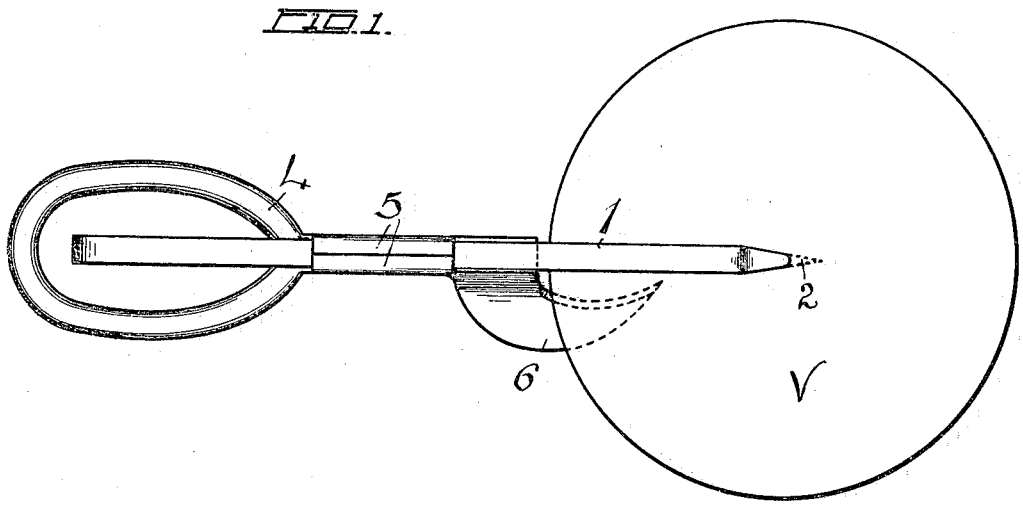
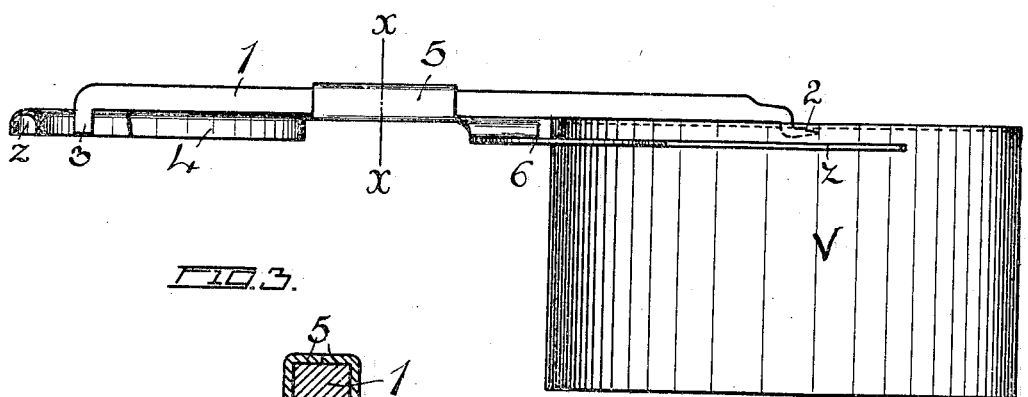
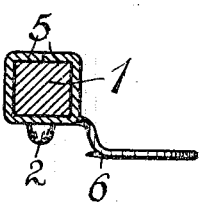
WITNESSES:
F. C. Larson
Meta Sands
BY,
INVENTOR:
Edward Novak
Geo. W. Sues.
Attorney No. 769,396. Patented September 6, 1904.

UNITED STATES PATENT OFFICE.

EDWARD NOVAK, OF OMAHA, NEBRASKA, ASSIGNOR OF ONE-HALF TO CHARLES F. KUNCL, OF OMAHA, NEBRASKA.

CAN-OPENER.

SPECIFICATION forming part of Letters Patent No. 769,396, dated September 6, 1904.

Application filed April 11, 1904. Serial No. 202,574. (No model.)

*To all whom it may concern:*

Be it known that I, EDWARD NOVAK, residing at Omaha, in the county of Douglas and State of Nebraska, have invented certain useful Improvements in Can-Openers; and I do hereby declare that the following is a full, clear, and exact description of the invention, such as will enable others skilled in the art to which it appertains to make and use the same, reference being had to the accompanying drawings, which form a part of this specification.

This invention relates to a new and useful improvement in can-openers.

The object of my invention is to provide a can-opener so constructed that a round or oval can may be cut upon its side or along its peripheral edge, so that in removing the severed top an unobstructed opening is offered of the full diameter of the can.

In the accompanying drawings I have shown in Figure 1 a top view of a can-opener embodying my invention. Fig. 2 shows a side view with portions broken away disclosing the opener within the can, while Fig. 3 discloses a sectional view on line $x\ x$, Fig. 2.

The aim of my invention is to provide a two-piece can-opener, the handle and cutter-blade being made of sheet-steel, in connection with which I use a pivotally-held guide-bar, upon which the cutter reciprocates.

In carrying out the aim of my invention I provide a can-opener embodying the approximately oval handle 4, made of sheet-steel grooved or bent to present a half-round section, as is shown at $z$ in Fig. 2, and from this handle 4 extend the members 5, forming ears which are lapped over against one another, as is shown in Fig. 3, to provide a keeper for the guide-bar 1, which works within said ears. Extending from adjacent these ears 5 is an approximately crescent-shaped cutter-blade 6, as shown in top view in Fig. 1. Working within the ears 5 is the bar 1, provided with the downwardly-projecting end 3, acting as a stop to this guide-bar 1, so that the longitudinal movement of this guide-bar 1 is controlled by the interior diameter of the oval loop-handle 4, as is disclosed in Fig. 2. At its forward end this guide-bar is bent in the form of a bayonet, the point being adapted to be inserted into the top of a can and about which point the guide-bar is pivotally carried, the blade 6 being forced into the side of the can, as is disclosed in Figs. 1 and 2.

These can-openers may be made of any suitable sizes and it will be noticed comprise but two members—the combined handle and blade provided with the ears and the guide-bar. It is of course understood that the handle and cutter-blade 6 are made of sheet-steel.

Having thus described my said invention, what I claim as new, and desire to secure by United States Letters Patent, is—

A can-opener comprising a loop-handle, ears secured to said handle, a crescent-shaped knife extending from adjacent said ears, and a guide-bar reciprocating within said ears, said guide-bar being provided at one end with a point and at the other with a downwardly-extending stop arranged so that the movement of said guide-bar is controlled by the inner circumference of said loop-handle said stop engaging the same, as and for the purpose set forth.

In testimony whereof I affix my signature in presence of two witnesses.

EDWARD NOVAK.

Witnesses:
 FREDERICK J. LARSON,
 META SANDS.